(12) United States Patent
Van Velthoven et al.

(10) Patent No.: US 10,907,987 B2
(45) Date of Patent: Feb. 2, 2021

(54) SYSTEM AND METHOD FOR DETECTING A CHANGE ON A MOVING SURFACE

(71) Applicant: Laborelec CVBA, Linkebeek (BE)

(72) Inventors: Robrecht Van Velthoven, Antwerp (BE); Michaël Burm, Ghent (BE); Olivier Decroupet, Schaarbeek (BE); Luc Van Goethem, De Klinge (BE); Renaud Ligot, Seneffe (BE)

(73) Assignee: Laborelec CVBA, Linkebeek (BE)

( * ) Notice: Subject to any disclaimer, the term of this patent is extended or adjusted under 35 U.S.C. 154(b) by 0 days.

(21) Appl. No.: 16/308,658

(22) PCT Filed: Jul. 15, 2016

(86) PCT No.: PCT/EP2016/066975
§ 371 (c)(1),
(2) Date: Dec. 10, 2018

(87) PCT Pub. No.: WO2017/211433
PCT Pub. Date: Dec. 14, 2017

(65) Prior Publication Data
US 2019/0271567 A1    Sep. 5, 2019

(30) Foreign Application Priority Data

Jun. 10, 2016  (EP) ..................................... 16173930
Jun. 30, 2016  (BE) ..................................... 2016/5526

(51) Int. Cl.
*G01D 4/00*    (2006.01)

(52) U.S. Cl.
CPC .............. *G01D 4/008* (2013.01); *Y02B 90/20* (2013.01); *Y04S 20/30* (2013.01)

(58) Field of Classification Search
CPC ........ G01D 4/008; Y02B 90/247; Y04S 20/50
See application file for complete search history.

(56) References Cited

U.S. PATENT DOCUMENTS

| | | | |
|---|---|---|---|
| 5,130,641 A | 7/1992 | Cornwall et al. | |
| 6,271,523 B1* | 8/2001 | Weaver | G01D 4/002 250/221 |

FOREIGN PATENT DOCUMENTS

| | | | |
|---|---|---|---|
| EP | 2634537 A1 | 2/2013 | |
| EP | 2950053 A1 | 5/2015 | |
| GB | 2296090 A | 12/1994 | |
| WO | WO 00/68643 * | 11/2000 | ............... G01D 4/00 |

OTHER PUBLICATIONS

International Search Report and Written Opinion pertaining to PCT/EP2016/066975, 11 pages.

* cited by examiner

*Primary Examiner* — Tony Ko
(74) *Attorney, Agent, or Firm* — Dinsmore & Shohl LLP

(57) ABSTRACT

A system is provided for detecting a change on a moving surface, for instance in color and/or texture, comprising: at least one light generating device for generating light to be directed to the moving surface; and at least one light sensor for capturing reflected light from the moving surface; wherein the change on the moving surface, for instance in color and/or texture, is detected based on the reflected light captured by the light sensor.

15 Claims, 17 Drawing Sheets

1110

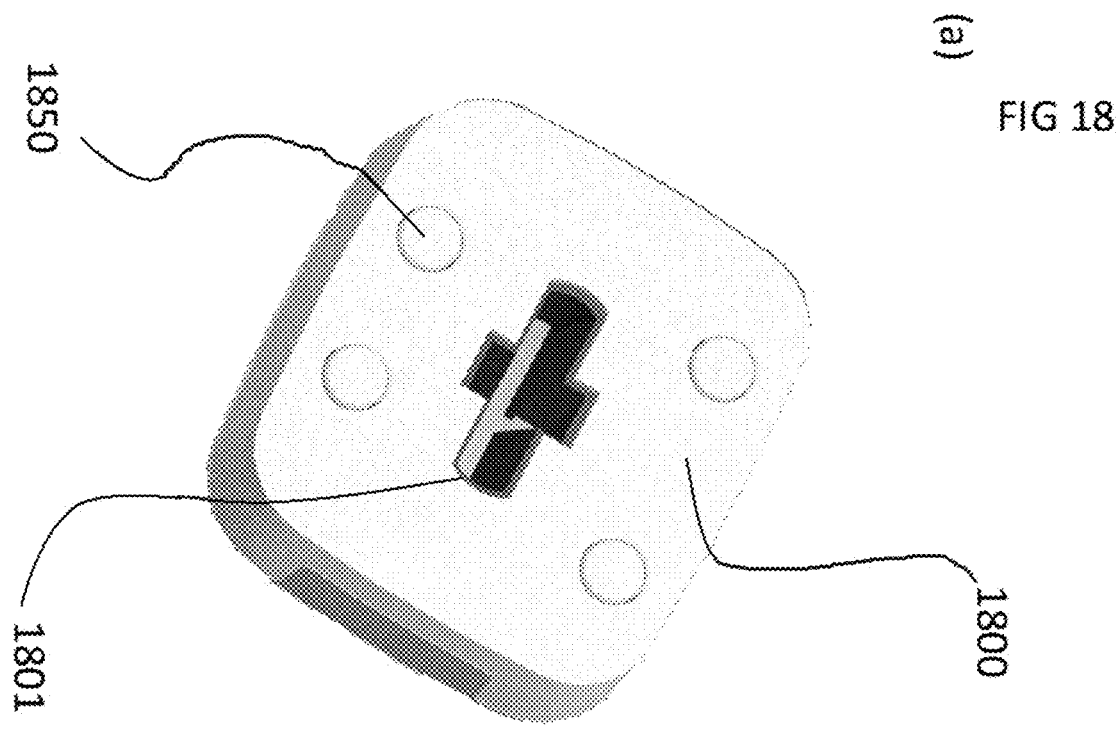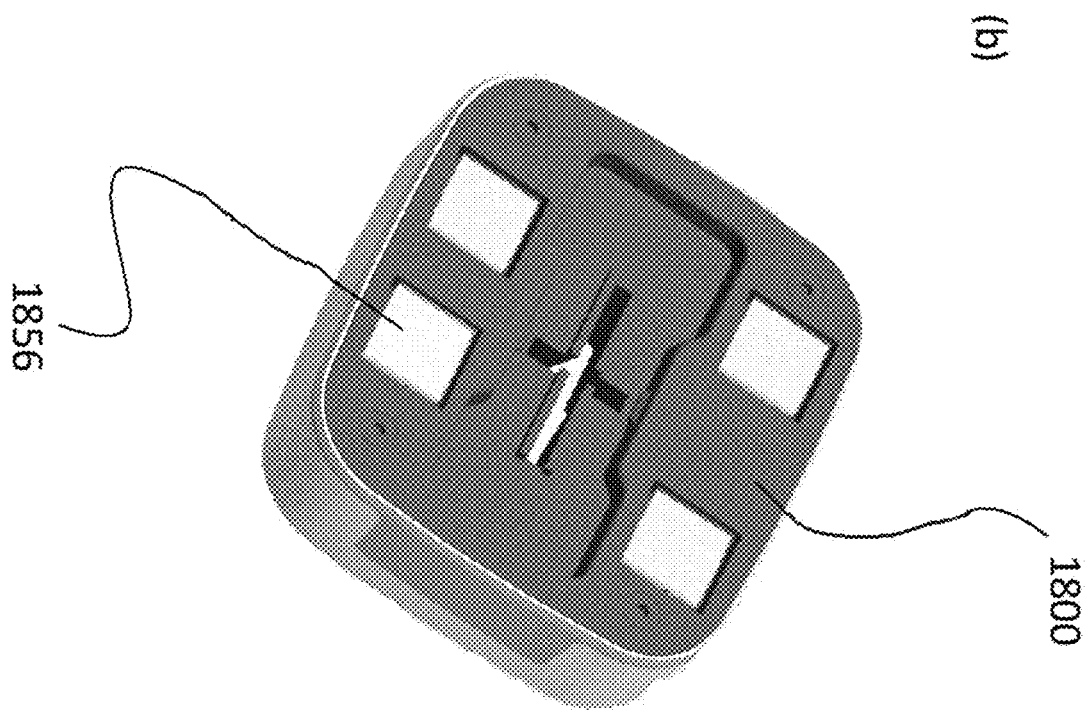
FIG 18

SYSTEM AND METHOD FOR DETECTING A CHANGE ON A MOVING SURFACE

FIELD OF THE INVENTION

The invention relates to systems and methods for detecting a change on a moving surface, such as for instance a rotating disc, provided with a mark, of an electricity meter.

BACKGROUND OF THE INVENTION

The consumption measured by an electricity meter with a rotating disc can be derived from the number of rotations of the disc, counted or calculated by marking the disc with a dot or image, and hence indicating a full rotation. The following problems are identified in the field of sensors for detecting the rotation of a disc with an indicator mark in an electric power meter:
  No possible use of state-of-the-art sensors or sensor systems at a largely variable distance from an electricity meter. Moreover, further difficulties in detection are observed when the watt-hour meter is enclosed in a transparent/translucent cabinet, in addition to the glass housing of the meter.
  Disturbing effect of ambient light—variable from dark at night to very bright artificial lamps or direct sunlight.
  Installing of a sensor requires particular technical handling for initiating the detection.
  Sensor is disabling visibility of the utility meter: one can no longer look at the details of the electricity meter when the sensor is mounted for detection. The sensor is either fixed or devious in removing and/or reinstalling. Moreover, when reinstalling the exact positioning from previous set-up cannot be achieved.
There is a need for a solution for the above stated problems.

AIM OF THE INVENTION

The invention aims at providing systems and methods for detecting a change on a moving surface which can be applied at a fairly variable distance while achieving the same final output, to be used at any ambient light conditions, and comprising an automatic self-learning or self-adapting calibration, in an easily removable and reproducible way.

SUMMARY OF THE INVENTION

In a first aspect of the invention is provided, a system for detecting a change on a moving surface, for instance in color and/or texture, comprising: at least one light generating device for generating light to be directed to the moving surface; and at least one light sensor for capturing reflected light from the moving surface; wherein the change on the moving surface, for instance in color and/or texture, is detected based on the reflected light captured by the light sensor. The light that is reflected from the moving surface is mainly originating from the light generating device. Moreover, the at least one light generating device and the at least one light sensor are arranged (e.g. positioned or oriented) relatively towards each other such that the change on the moving surface is reliable detected for a variable distance within a predetermined range of the system installed or mounted away from the moving surface. According to an embodiment, this variable distance is for instance varying from a few mm to a few cm or even tens of cm. As an example, a mark on a rotating disc of an electricity meter is detected by means of such a system. Moreover, the system is e.g. used wherein the moving surface being the periphery of a rotating disc, and the detected change or mark on the rotating disc can be used to detect the rotations of the disc. Instead of an electricity meter, the system is also applicable when using a utility meter in general that is provided with a marked rotating disc as referred to above.

Moreover, the system may be characterized in that it comprises a housing wherein its devices, i.e. the light generating device, the light sensor and a component or system for detecting the change on the moving surface, are mounted. The interior of the housing of these devices may be adapted or manipulated, e.g. made black, for preventing reflections of light internally in the system, otherwise directly or indirectly possibly captured by the light sensor. Such internal reflections can be disturbing or destroying the signal of the reflected light from the moving surface.

The system may further comprise optical means such as lenses for focusing the light emitted from the light generating device and/or the light being reflected from the moving surface; whereby the optical means corresponding to the light emitted from light generating device being oriented different than the optical means corresponding to the reflected light before being captured by the light sensor. The difference in orientation is for instance defined by the fact that the optical axis of the lens corresponding to the emitted light, also referred to as the emitting lens, is no longer parallel with the optical axis of the lens corresponding to the reflected light, also referred to as the receiving lens. In other words the optical axis of the lens corresponding to the reflected light is for instance slightly deviating from the parallel (to the optical axis of the lens corresponding to the emitted light) and hence being positioned at a certain angle. Tilting the receiving lens inwards for example—thereby seemingly enclosing the optical set-up—may further concentrate and enhance the signal captured on the light sensor, whereas due to the tilt the reflected light is possibly more directed perpendicularly towards the light sensor. Moreover, further to the one light generating device and the one light sensor their corresponding first and second optical means are arranged (e.g. positioned or oriented) relatively towards each other such that the change on the moving surface is reliable detected for a variable distance within a predetermined range of the system separated from the moving surface. As an example, this variable distance is for instance varying from a few mm to a few cm or even tens of cm. According to an embodiment of the invention, the lens corresponding to the emitted light, is mounted in the system with its optical axis substantially perpendicular to the moving surface, and at a position such that its distance to the moving surface is comparable or almost equal to the distance between the lens corresponding to the reflected light and the moving surface. In other words, both lenses lie in substantially the same optical plane at a certain distance from the moving surface.

Moreover, the interior of the system's housing of its devices wherein the optical means are also mounted, may be further adapted for preventing reflections of light internally in the system by providing physical barriers. In particular, such physical barriers are provided between the optical means.

The system moreover may comprise a further light generating device for generating light to be directed to the moving surface; and a further light sensor for capturing reflected light from the moving surface; wherein the change on the moving surface, for instance in color and/or texture, is further detected based on the reflected light captured by the further light sensor; and wherein the change on the moving surface as detected twice in a respective manner is compared for generating further information about the movement of the moving surface. In other words, the system may comprise two light generating devices for generating light to be directed to the moving surface, whereas two light sensors can be further used to capture the reflected light from the moving surface. Preferably, the two light generating devices, or light sources, are mounted such that light generated by either one of them is directed in parallel. Hence, two parallel light beams are emitted from the respective light sources. Detecting the change twice enables to retrieve more particular information regarding the movement itself of the moving surface. For instance, in case of a rotating disc with a mark as used for an electricity meter, the rotation direction of the disc can hence be determined with the mark detected twice, as compared to the speed or number of rotations being definable when the mark is detected just once.

The system as described may comprise a LED and accompanying driver as light generating device, whereas the light sensor is for example a phototransistor.

Additionally, the system comprising at least one light generating device with corresponding optical means, determined as an emitting lens, and at least one light sensor with corresponding optical means, determined as a receiving lens, may be designed such that there is a particular relation between the position of the emitting lens and the receiving lens. Moreover, in case of detecting the periphery of a rotating disc, the optical axis of the emitting lens is not necessarily colliding with the diameter of the disc perpendicular to the emitting lens' plane, but may be positioned off-set, meaning at a certain distance from the elongation of this diameter. Further, there may be a particular relation between this certain off-set distance on one hand and the distance between the emitting lens and the receiving lens on the other hand. According to an embodiment of the invention, when this latter relation is also related to the field of view of the light sensor or phototransistor used, the permitted distance of the system to the mounting surface becomes largely variable without having an effect on the interpretation of the signal for detecting a change or a mark on a rotating surface. The receiving lens e.g. condenses the reflected light from the moving surface in one particular direction to accomplish a compressed ellipse-alike view instead of a more circular shape. The signal is hence condensed for efficient and optimal detection.

According to a second aspect of the invention is provided, a method for detecting a change on a moving surface, for instance in color and/or texture, wherein signal processing and signal conditioning are performed such as e.g. sampling at a particular sampling rate and filtering around a particular central frequency, wherein light from a moving surface is used and transformed into an interpretable signal, in order to detect a change on the moving surface. With this signal processing and signal conditioning, the influence of any kind of ambient light conditions—be it dark night or bright sunlight—is eliminated for correct interpretation of the signal. According to an embodiment, the method as described is applied by use of the system according to the first aspect of the invention.

According to a third aspect of the invention is provided, a method for detecting a change on a moving surface, for instance in color and/or texture, wherein signal processing is performed such that at least two thresholds are automatically generated for detecting a change on a moving surface. Moreover, these thresholds can be self-adapting or self-learning for continuously updated signal calibration.

According to an embodiment, absolute and local minima are used for this signal processing and signal calibration. With this signal processing, the influence of dirt, aging, temperature, discoloring or other wear and tear is eliminated for correct interpretation of the signal. According to an embodiment, the method as described is applied by use of the system according to the first aspect of the invention.

According to a fourth aspect of the invention is provided, a system for detecting a change on a moving surface, for instance in color and/or texture, comprising: a housing wherein the devices of the system are mounted; and at least one bracket for removable attachment of the system's housing to a mounting surface, from where a change on the moving surface is viewable; wherein the bracket is provided with an adhesive, and mechanical obstructions matching with a mechanical obstruction provided onto the housing. Hence, the system may be adapted for being removable attached to a mounting surface of an arrangement with a moving surface to be detected for a change, for instance in color and/or texture. The bracket is for example provided with at least two bumps and adjacent notches. The system's housing is for instance provided with a pin matching in shape and size with either of the notches in the bracket. The bracket can be retained in at least two positions: a first hold position of the housing's pin in a first notch can be used to facilitate correct positioning of the system to the mounting surface, whereas a second hold position of the housing's pin in a second notch can be used for pressing the bracket against the mounting surface. Furthermore, when the pressing surface of the bracket is provided with an adhesive such as dual-sided tape, the bracket can be fixed to the mounting surface. According to an embodiment of the invention, the bumps and notches differ in size and/or shape: a thick large bump is particularly chosen from pressing the bracket against the mounting, applying a rather significant force to perform this; a small bump is particularly designed to hold a certain position but also enable easy removal and re-attachment of the housing onto the bracket. It is noted that the removable attachment principle according to the present invention as described above, is also applicable in case of other circumstances, occasions or applications where a detecting or metering system is not necessarily present, but wherein it is required to easily install, as well as attach and remove a particular system or device, and frequently re-attach and re-remove if needed—with the possibility to return every time when re-attaching to the same attaching position—and in a very user-friendly manner.

According to a fifth aspect of the invention is provided related software, a computer program product as well as a non-transitory machine-readable storage medium for storing such computer program product.

One aspect of the invention may be combined with another aspect of the invention, and preferably one or more of the aspects of the invention are combined in that considering presence thereof invokes a further beneficial technical effect on another, more in particular the synergetic effect of combining of aspects lying within domains (such as physical/mechanical choices versus choice of signals versus the signal processing) are worth noting.

DESCRIPTION OF THE DRAWINGS

FIGS. 18 illustrates (a) front and (b) backside of an alignment tool used for positioning the brackets according to an embodiment of the invention.

DETAILED DESCRIPTION

A sensor system is designed to be mounted on an electricity meter or its cabinet and optically detect the rotations of the meter disc. Rotations are detected by directing the light of two LEDs on the disc, and detecting the occurrence of the black or red mark on the disc by the sharp change or decrease in reflected light it causes, captured by two phototransistors. Two sets of LED and phototransistor are used to make the sensor system able to detect not only the rotations of the disc but also its rotation direction.

The sensor system processes the data from the phototransistors internally to obtain the necessary information about the rotation of the meter disc. Once a rotation has been detected, a pulse is sent to the meter module. A register of the total number of rotations is also kept internally so that a meter module system can consult it if necessary.

Each part of the sensor system is described in detail below:
Fixation mechanism
Housing
Optical system
PCB and components
Algorithms and processing Moreover, installation and use of the sensor system is particularly described in subsequent paragraphs.

Finally, an overview is given of the challenges overcome by means of the present invention.

DETAILED DESCRIPTION OF THE DRAWINGS

Figure 1:
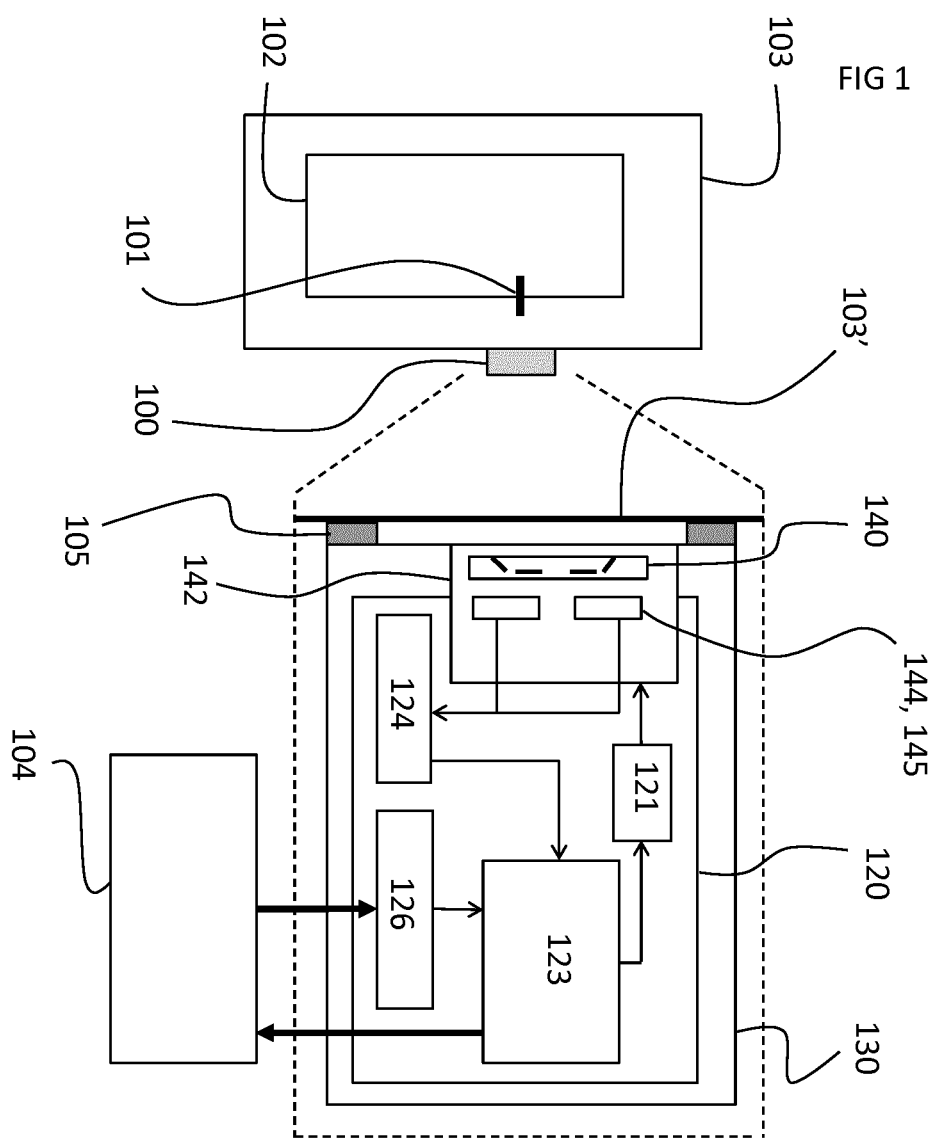
FIG. 1 schematically shows the functional diagram of a sensor system in an application set-up in accordance with an embodiment of the present invention.

According to an embodiment of the invention, the device consists of a number of different parts, as depicted in FIG. 1. This figure is a functional diagram of the sensor system 100, mounted on the meter cabinet 103 of a watt-hour meter 102, comprising a rotating disc 101. The meter cabinet 103 is for instance a transparent or translucent closet made of poly methyl methacrylate (PMMA), polycarbonate or a regular glass type. More into detail, the sensor system 100 as being attached onto the outside meter cabinet wall 103', comprises of components and functionalities as indicated further within the dashed lines. For instance, a fixation mechanism 105 is provided in order to fulfill the attachment of the sensor system housing 130 onto the cabinet wall 103'. Within the housing 130, a PCB 120 and its electronic components is provided, as well as an optical system 142, comprising lenses 140 optionally including filters, and light emitters 144 and light receivers 145. The signal as captured by a light receiver 145—and also in connection with the PCB 120, is transmitted for signal conditioning by a signal conditioning element 124 and further processing by means of a central processing unit or CPU 123. The CPU 123 is also in direct relation with a driver 121 connected with the PCB 120, for powering the light emitters 144 under control of the CPU 123. A bidirectional communication interface 126 connected with the PCB 120 and in direct relation to the CPU 123 allows the retrieval of information from the sensor system 100, like for instance power consumption or power production as well as to send information to the sensor module as for instance configuration parameters or upgrading the application of the CPU 123, with an externally connected device 104, also referred to as meter module. Pictures and more detailed schematics will be referred to later on, when discussing specific parts of this diagram.

Figure 2:
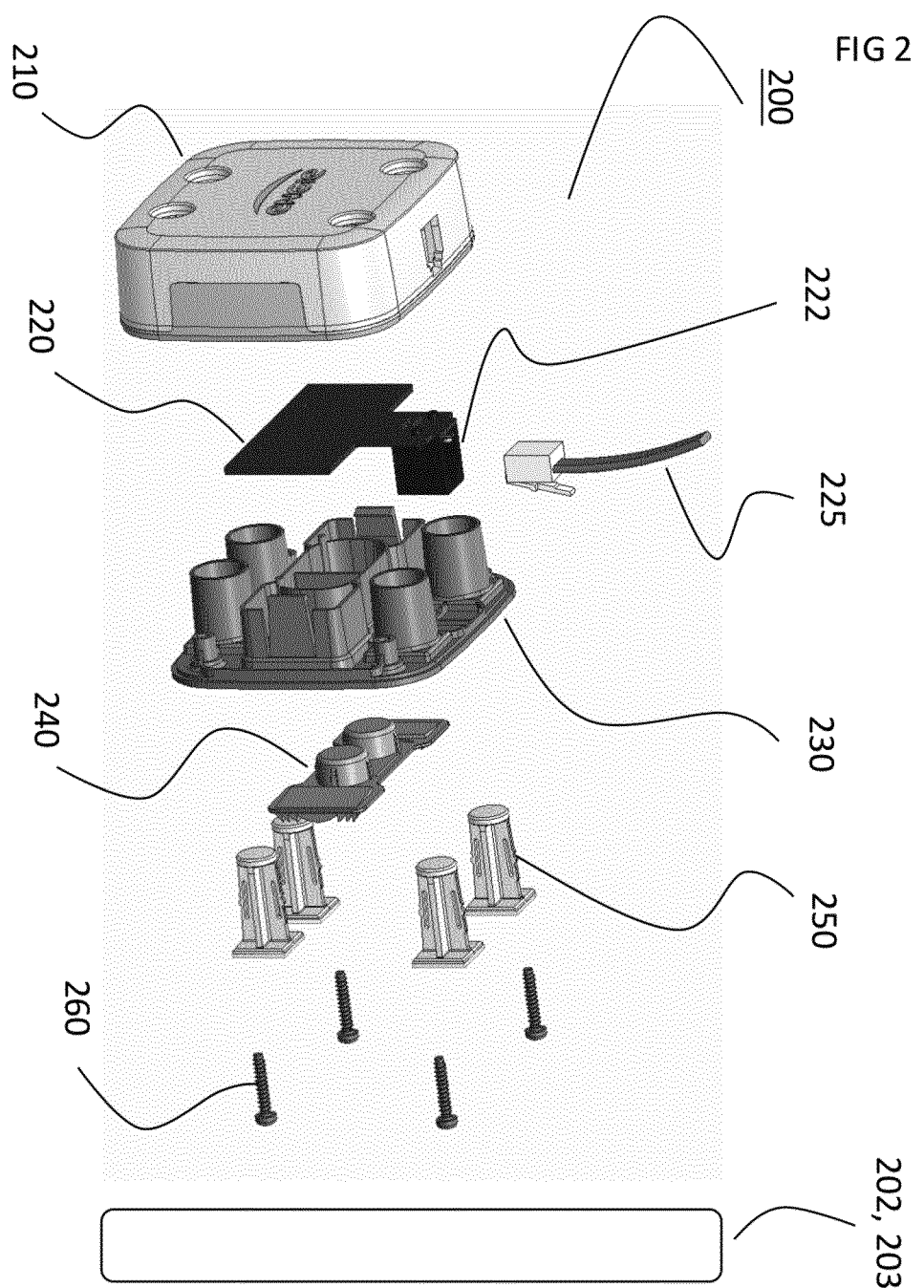
FIG. 2 illustrates an exploded view of the sensor system according to an embodiment of the present invention.

An exploded view of an embodiment of the sensor system 200 is presented in FIG. 2, as well as a meter 202 or meter cabinet 203 onto which the sensor system 200 can be mounted. This sensor system 200 as illustrated in FIG. 2 comprises of the following parts: a cover 210 as part of the housing 130, a PCB 220 and mounted thereon a connector 222 and cable 225 to the meter module 104, an assembling part 230 of the housing 130, a lens plate 240, fixation brackets 250, and screws 260. Nor the driver 121, nor the light emitters 144 and light receivers 145 are depicted here, but are mounted onto and connected with the PCB 220.

Fixation Mechanism

In accordance with an embodiment of the invention, the sensor system 100, 200 can be placed on any meter 102, 202 or meter cabinet 103, 203 presenting a flat transparent or translucent surface 103' that is large enough for the sensor system in front of the meter disc 101. The fixation mechanism 105 developed for this sensor system 100, 200 presents multiple advantages. It allows positioning the sensor system 100, 200 on a meter 102, 202 or meter cabinet 103, 203 without requiring any additional tool. It also makes it possible for a user to remove the sensor system 100, 200 while leaving the brackets 250 in their position. This allows an easy reading of the meter index without the sensor system 100, 200 being in the field of view. It is afterwards easy to put the sensor system 100, 200 back in place on the four brackets 250 that were left on the meter 102, 202 or the cabinet 103, 203. According to an alternative embodiment, for example in case there is limited view of the disc 101 within the meter 102, 202 or meter cabinet 103, 203, making alignment of the sensor system 100, 200 with the disc 101 difficult or rather impossible, a further tool 1800 as shown in FIG. 18, comparable with a housing cover in shape and size, and comprising a centralized cross-shaped viewing window 1801 is provided which holds the brackets 250 and allows them to be aligned with the disc 101. While FIG. 18 (a) is depicting the front side of the tool 1800, i.e. further away from the meter cabinet 103, 203 onto which the brackets 1850 are mounted, FIG. 18 (b) illustrates the backside of the tool 1800, meaning closer to the meter cabinet 103, 203, and moreover showing square-shaped parts of double-sided tape 1856, provided onto the brackets 1850 and being used to fix the brackets 1850 onto the meter cabinet 103, 203.

Figure 3:
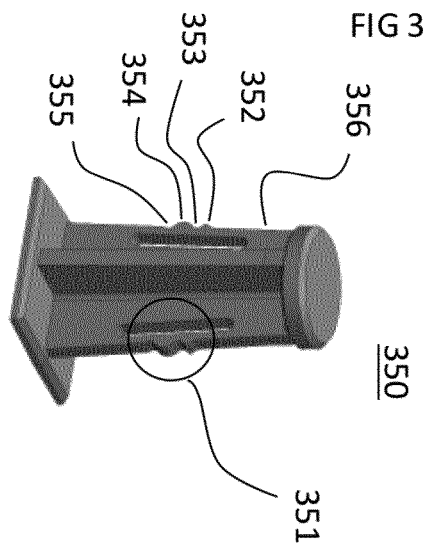
FIGS. 3 and 4 illustrate the bracket in different views in accordance with an embodiment of the present invention.
Figure 4:
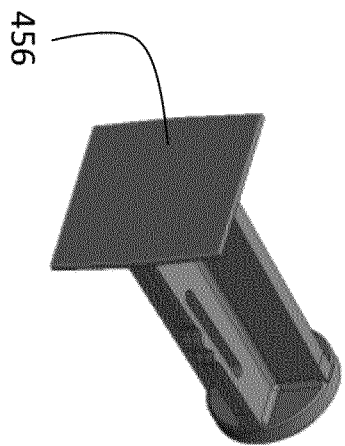
Figure 5:
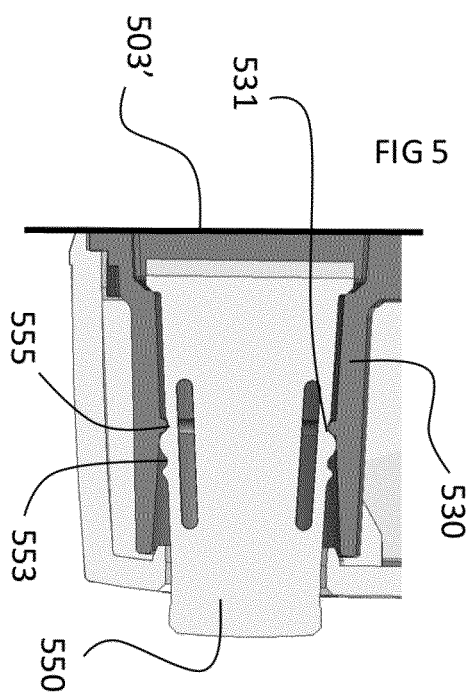
FIG. 5 illustrates the hold position of the bracket according to an embodiment of the present invention.
Figure 6:
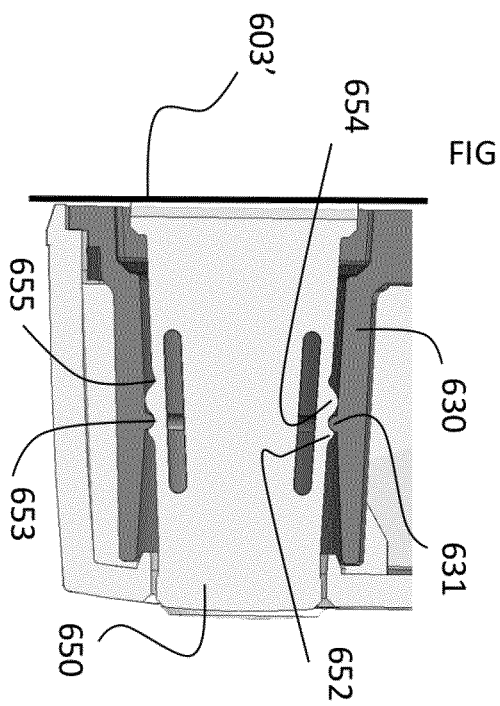
FIG. 6 illustrates the pressed position of the bracket according to an embodiment of the present invention.

The fixation mechanism 105 consists of four brackets 250, 350, 450, of which different views are illustrated in FIGS. 3 and 4. The brackets 250, 350, 450 are held inside the housing 130, more particularly inside the assembling part 230 of the sensor system 100, 200 using a kind of snaps or clicking mechanism 351 with bumps and notches. Double-sided Very High Bond tape 456 is used to fix the brackets 250, 350, 450 onto the transparent surface 103', and to maintain these brackets 250, 350, 450 in their positions, as shown in FIG. 4. According to an embodiment of the invention, the surface provided with dual-sided tape, is not completely arbitrary, but well-chosen, including the number of attached bracket surfaces are part of the design. It appears to be that a particular surface for attachment is better divided into four respective smaller mounting areas rather than concentrating the attachment surface to a single large area. In a first instance, the brackets 250, 350, 450, 550 are held in position within the housing's assembling part 230, 530—and enabled by means of a pin 531—as described in FIG. 5. This allows the user to move the sensor system 100, 200 on the surface 103', 503' where it will be placed without having the tape 456 come into contact with the surface. Once the sensor system 100, 200 is in correct position, the brackets 250, 350, 450, 550, 650 can be pressed against the surface 103', 603', as shown in FIG. 6. This makes the double-sided tape 456 on the bracket 250, 350, 450 come into contact with the meter 102, 202 or the meter cabinet 103, 203.

Further referring to FIG. 3, the brackets 350 are for example provided with at least two bumps 352, 354 and adjacent notches 353, 355 in a longitudinal bracket rod 356. Referring again to FIG. 5, the system's housing assembling part 530 is for instance provided with a pin 531 matching in shape and size with either of the notches 553, 555 in the bracket 550. Hence, the bracket 550 can be retained in at least two positions: a first hold position of the housing's pin 531 in a first notch 555 can be used to facilitate correct positioning of the system 100, 200 to the mounting surface 503', illustrated in FIG. 5, whereas a second hold position of the housing's pin 631 in a second notch 653 can be used for pressing the bracket 650 against the mounting surface 603', as shown in FIG. 6. Furthermore, when the pressing surface of the bracket 650 is provided with an adhesive such as dual-sided tape, the bracket 650 can be fixed to the mounting surface 603'. According to an embodiment of the invention, the bumps and notches may differ in size and/or shape. As depicted for example in FIG. 6, a thick large bump 654 is particularly chosen from pressing the bracket 650 against the mounting surface 603', applying a rather significant force to perform this; a small bump 652 is particularly designed to hold a certain position but also enable easy removal and re-attachment of the housing's assembling part 630 onto the bracket 650.

Housing

While referring again to FIGS. 1 and 2, according to an embodiment of the invention, the housing 130 of the sensor system 100, 200 consists of two main parts. A first black part 230 on the side of the meter 102, 202 holds the lenses 140, provided within a lens plate 240, the PCB 120, 220 and the four brackets 250. This assembling part 230 needs to be black to avoid internal reflections of the light from the light emitters 144, such as for instance LEDs to the light receivers 145 e.g. phototransistors, which could have a negative influence on the correct interpretation and functioning of the sensor system 100, 200. The second part or cover 210 is on the backside of the sensor system 100, 200 and mainly serves to close the sensor system housing 130, required to achieve the IP51 standard for the sensor system 100, 200 (related e.g. to water drops and dust free applications).

Figure 7:
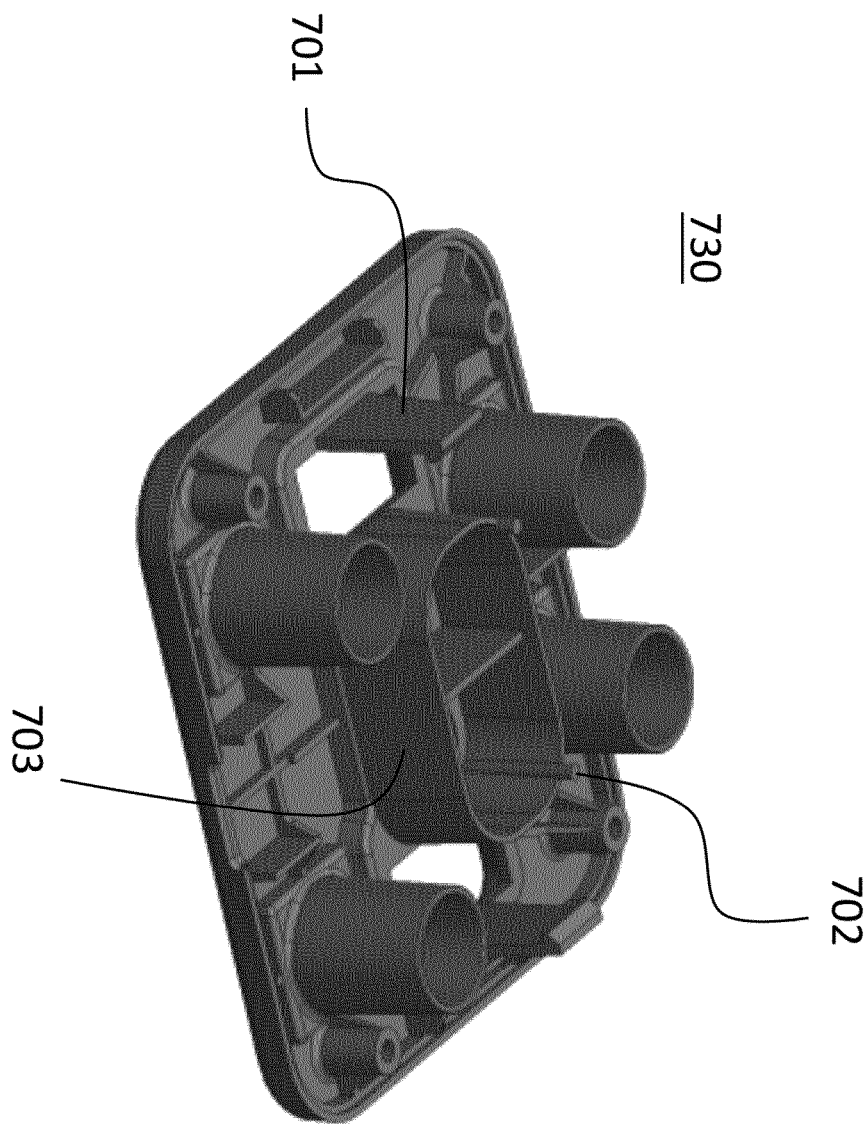
FIG. 7 illustrates one side the assembling part of the housing in accordance with an embodiment of the present invention.
Figure 8:
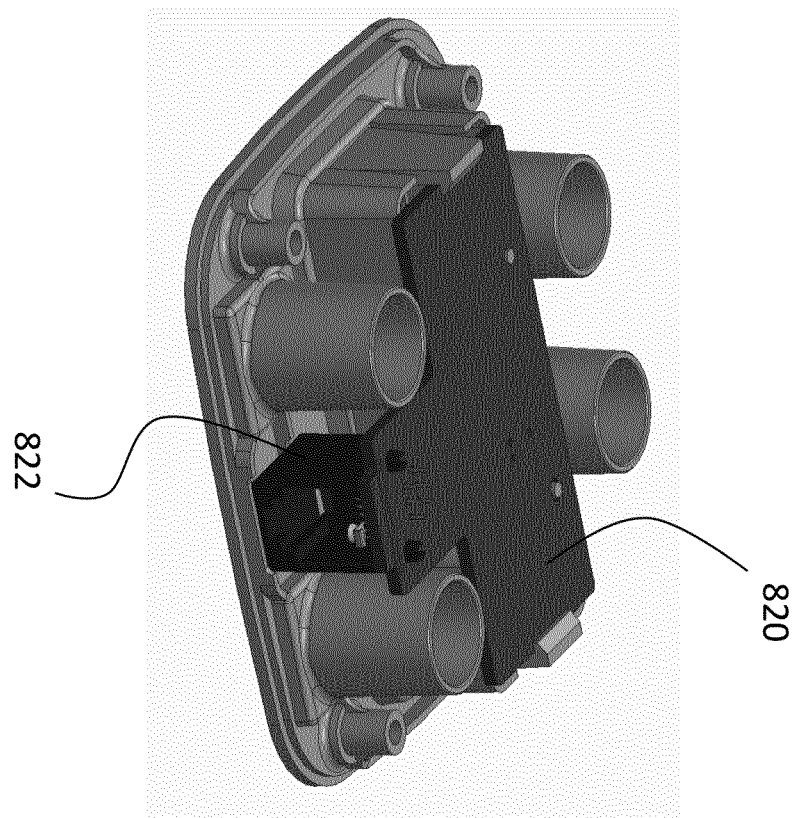
FIG. 8 illustrates the other side of assembling part of the housing provided with PCB and connector in accordance with an embodiment of the present invention.
Figure 9:
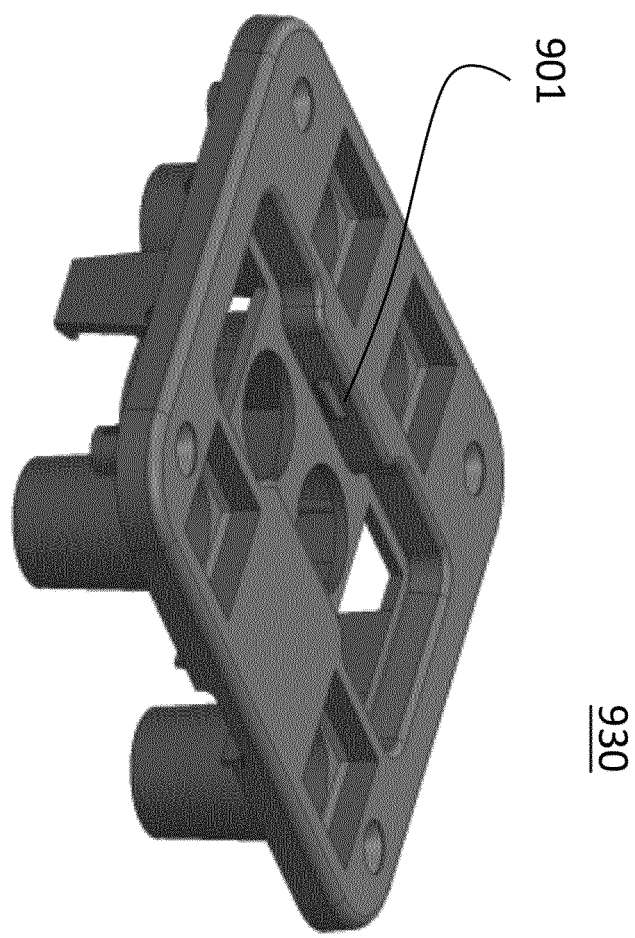
FIG. 9 illustrates the assembling part of the housing in accordance with an embodiment of the present invention.
Figure 10:
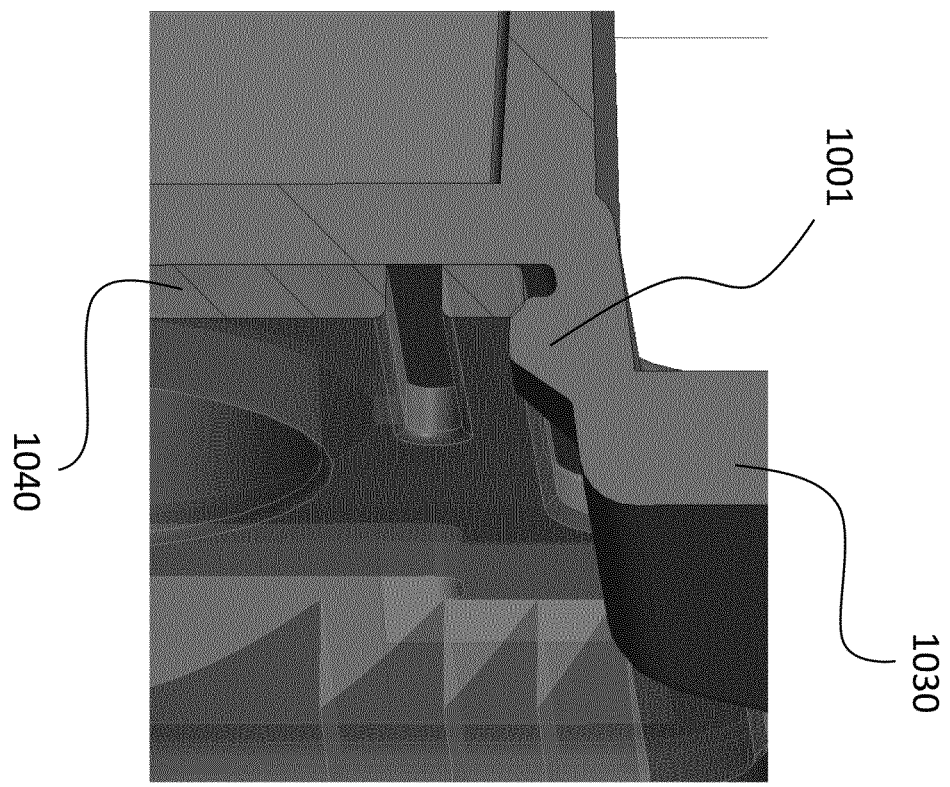
FIG. 10 shows detail of the undercut snap depicted in FIG. 9.
Figure 11:
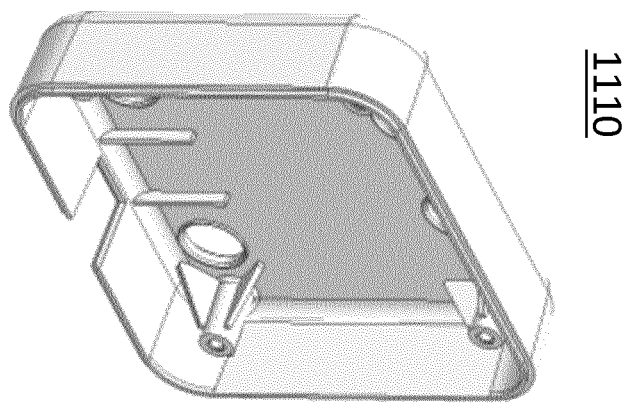
FIG. 11 illustrates the cover of the housing according to an embodiment of the invention.

FIGS. 7-10 show the assembling part 230, 730, 930 of the housing 130 in accordance with an embodiment of the invention. FIG. 7 depicts the inner side of the assembling part 730 onto which the PCB is held in position by the snaps 701, particularly attaching, and the pins 702, particularly positioning. As clearly shown in FIG. 2, the inner side of the assembling part 230 is particularly oriented towards the housing's cover 210. A baffle 703 between the LEDs 144 and the phototransistors 145 is provided as physical barrier in order to reduce or eliminate internal reflections. The assembling part 730 provided with PCB 820 and connector 822 mounted thereon is shown in FIG. 8. FIG. 9 shows the so-called outer side of the assembling part 930, i.e. the side that is oriented to the meter disc 101. By means of a snap 901 the lens plate 240 as illustrated in FIG. 2 is positioned and fixed. This is shown in a more detailed way in FIG. 10, wherein the lens plate 1040 is mounted onto the assembling part 1030 and moreover fixed by means of the snap 1001. A perspective view of the cover part 1110 is presented in FIG. 11, for ensuring a water drops free and dust free system. Both housing parts are attached to each other using four screws 260 as described above referring to the exploded view of FIG. 2.

Optical System

Figure 12:
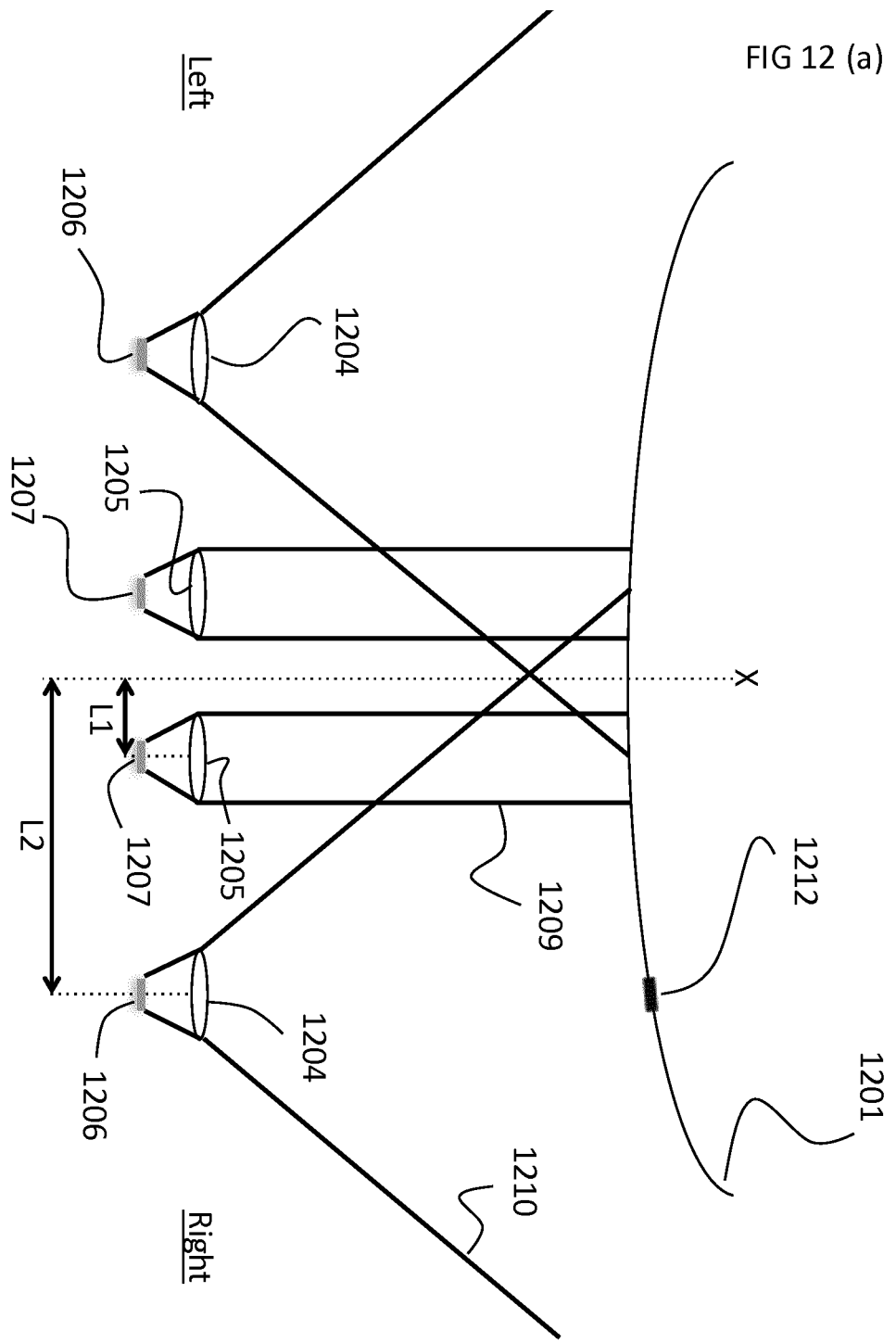
FIGS. 12 (a), (b), and (c) illustrate the optical concept according to the present invention.
Figure 12:
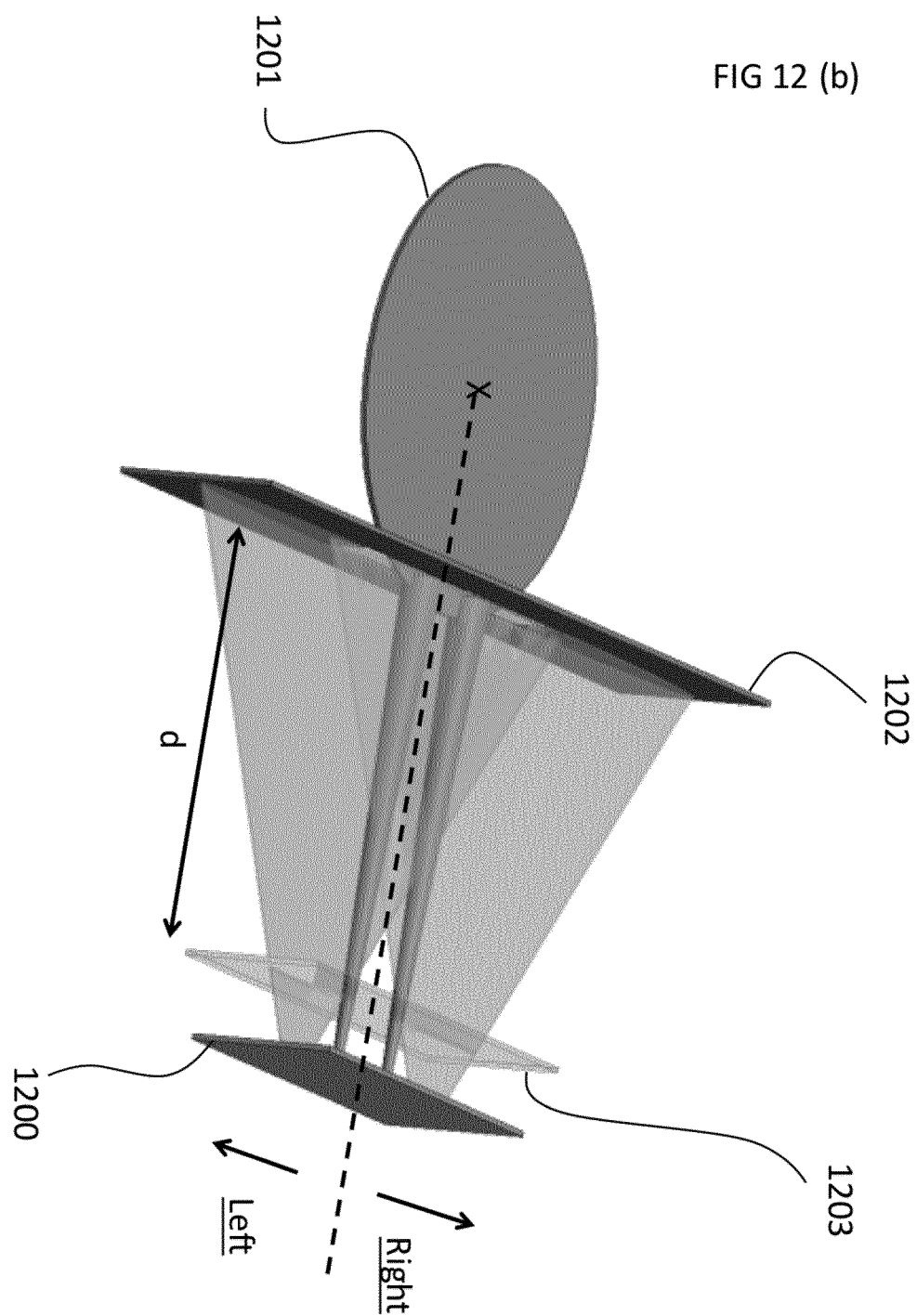
Figure 12:
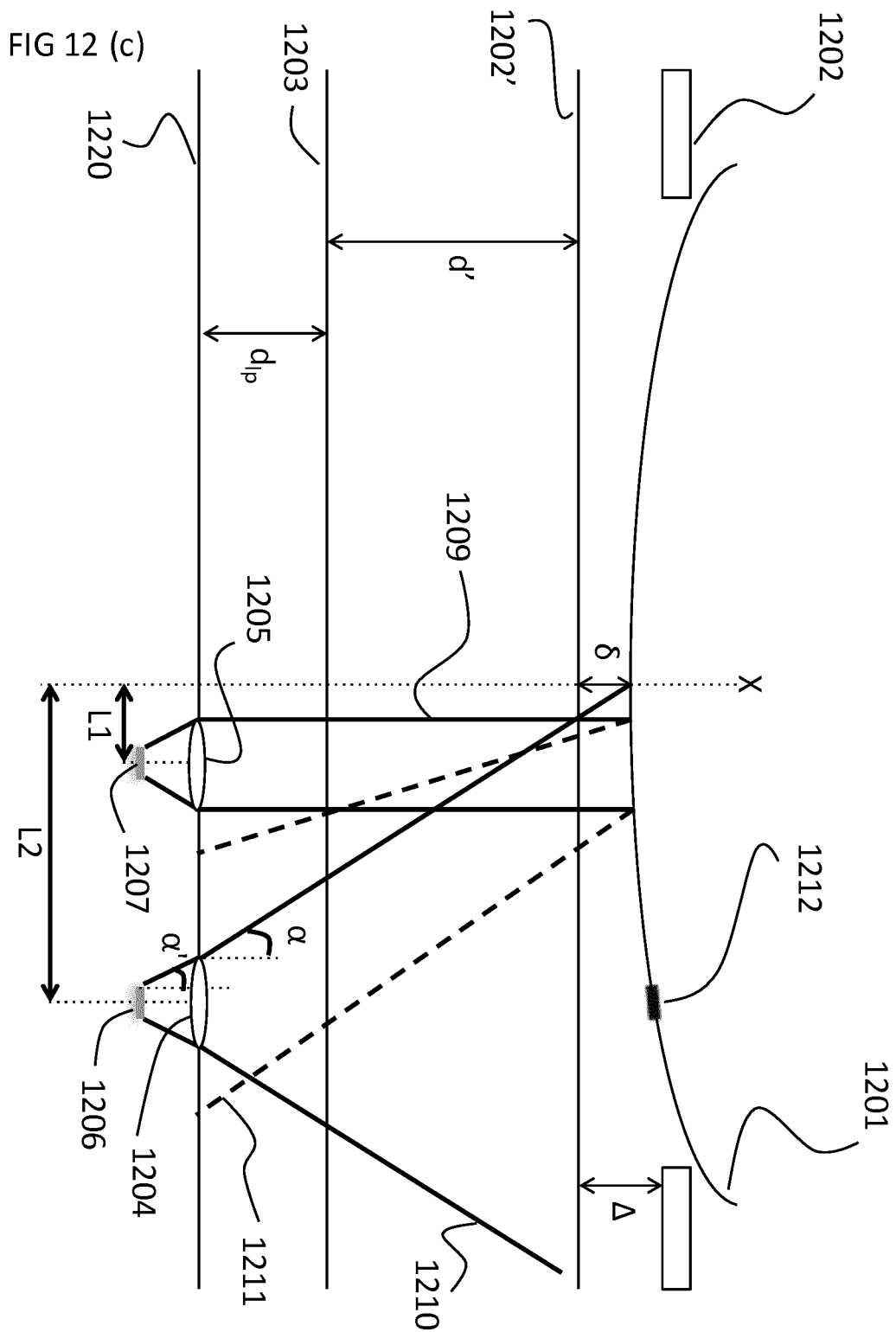

According to an embodiment of the invention, the main challenge in the design of the optical system 142 is to provide all good signal quality over a distance d with big variable distance range from 0.5 cm up to 10 cm between the sensor system 1200 mounted onto the outer cabinet surface 1203 and the meter 1202 itself, without any adjustment to be made during installation, as depicted in FIG. 12 (b). Further in this Figure, a dashed line is drawn, being the perpendicular—leaving the disc centre X—to the disc peripheral edge part that is to be measured, and dividing the sensor system 1200 is a Left side and a Right side respectively. FIG. 12 (c) is giving more detail (not drawn to scale) of the Right side of the optical system, particularly regarding the light emitters and light receivers, their corresponding optical elements and corresponding emitted and/or reflected light beams. Similar optics detail may be understood for the Left side of the sensor system. While referring also to FIG. 12 (c), the meter 1202, or more particularly the meter plate, for instance made of metal, may be provided with a meter glass 1202' put in front it, at a distance A measured from the meter plate, or at a distance δ taken from the disc 1201 protruding from the meter plate. Hence, a distance d' is given here as being the distance with big variable distance range between the cabinet surface 1203 onto which the sensor system 1200 may be mounted, and the meter glass 1202' from the meter 1202 itself. The distances Δ and δ are both variable. The distance δ may be smaller than the distance Δ meaning that the disc 1201 is protruding from the meter plate, but according to another embodiment, the disc 1201 may be located more inwards in the meter 1202, and therefor it is possible also that the distance δ becomes equal or larger than the distance Δ. The meter glass 1202' and/or the cabinet surface 1203 may be made of an optical medium such as PMMA or polycarbonate, possibly coloured or darkened, or otherwise treated. The refraction of light passing such an optical medium is negligible as compared to the throughput beam of the emitted and reflected light. Although there is a particular loss of signal due to the existence of an optical medium, this will eventually not effect the interpretation of the resulting signal by the sensor system. The disc 1201 with the mark 1212 and center X can vary in reflective property from very shiny over matt to corrugate. The designed optical system can cope with all these influences without any adjustments.

This is achieved by the optical concept as illustrated in FIG. 12 (*a*), (*b*) and (*c*) in accordance with an embodiment of the present invention. The light source chosen is a LED 1207. The LED 1207 is projecting light to the disc 1201 in a parallel beam 1209 by means of a first type of lens 1205. The beam 1209 is perpendicular to the meter 1202, meter glass 1202' or meter cabinet surface 1203, to avoid reflections on the (glass) window of the meter 1202 or meter cabinet 1203 directly into the receiving phototransistor 1206. The light reflected 1211 by the peripheral edge of the disc 1201 is captured by a phototransistor 1206 after having passed a second type of lens 1204, having a field of view 1210 characterized by an angle α. According to an embodiment of the invention, this phototransistor lens 1204 only manipulates the beam in a vertical direction, i.e. along a direction perpendicular to the meter disc 101. Hence with the horizontal plane or within a certain horizontal range of measurement, the angle α is not transformed by the lens 1204 and thus angle α may be considered equal to angle α' characterising the field of the phototransistor 1206 itself. Moreover, while referring to Left side and Right side of the sensor system, two LED lenses 1205 and two phototransistor lenses 1204 are installed with corresponding LEDs 1207 and phototransistors 1205. More particularly, one LED lens 1205 and one phototransistor lens 1204 are on the Left side, and one of each are provided on the Right side, including corresponding light emitters 1207 and receivers 1206. This specific optical set-up with a LED/phototransistor Left side and a LED/phototransistor Right side respectively is chosen in order to not only measure a change or mark 1212 on the moving disc 1201, but also enabling the sensor system 1200 to detect the direction of rotation of the moving disc 1201. The distances L1 and L2 in FIG. 12 (*a*) and (*c*) are measured from the perpendicular line of the center of the disc peripheral edge part to be measured, i.e. the dotted line outgoing the disc center X, towards the center of the LED 1207 or towards the center of the phototransistor 1206 respectively.

Considering the field of view of the phototransistor lenses 1204, and/or of the phototransistors 1206, the distances L1 and L2 are optimized to capture a good signal despite all the variables such as distance range, disc diameter and thickness, disc reflective properties, transparency and color of the meter cabinet without any adjustment required. The peripheral edge of the disc 1201 may be ribbed, or either a glossy surface. In this latter case, the reflected beam will be stronger and more directed, and hence the positioning of the lenses, or in other words the accuracy of the distances L1 and L2 becomes more critical.

According to an embodiment of the invention, there is a particular relation between the distance of the LED L1, and the distance of the phototransistor L2 to the perpendicular from the disc centre X on one hand, and the field of view characterizing angle α of the phototransistor lens, and the field of view characterizing angle α' of the phototransistor on the other hand, such that there is always an overlap between the LED spots and the field of view of the phototransistor. Whereas α≅α' within a horizontal range as mentioned above, further referring to FIG. 12 (*c*), the following formula may be applied:

$$(L2-L1) \geq \tan \alpha \cdot (d' + \delta + d_{lp});$$

with 15 cm≥d'≥0.2 cm, preferably 10 cm≥d'≥0.5 cm; and 5 cm≥δ≥0 cm, preferably 1 cm≥δ≥0.1 cm and $d_{lp}$ being the distance between the meter cabinet 1203 and the lens plate 1220 of the sensor system 1200, whereas for example 15 mm≥$d_{lp}$≥1 mm, preferably 10 mm≥$d_{lp}$≥2 mm and L1 is approximately 5 mm, given the diameter of the LED lens is about 15 mm, and the width of the phototransistor lens is about 12 mm.

Figure 13:
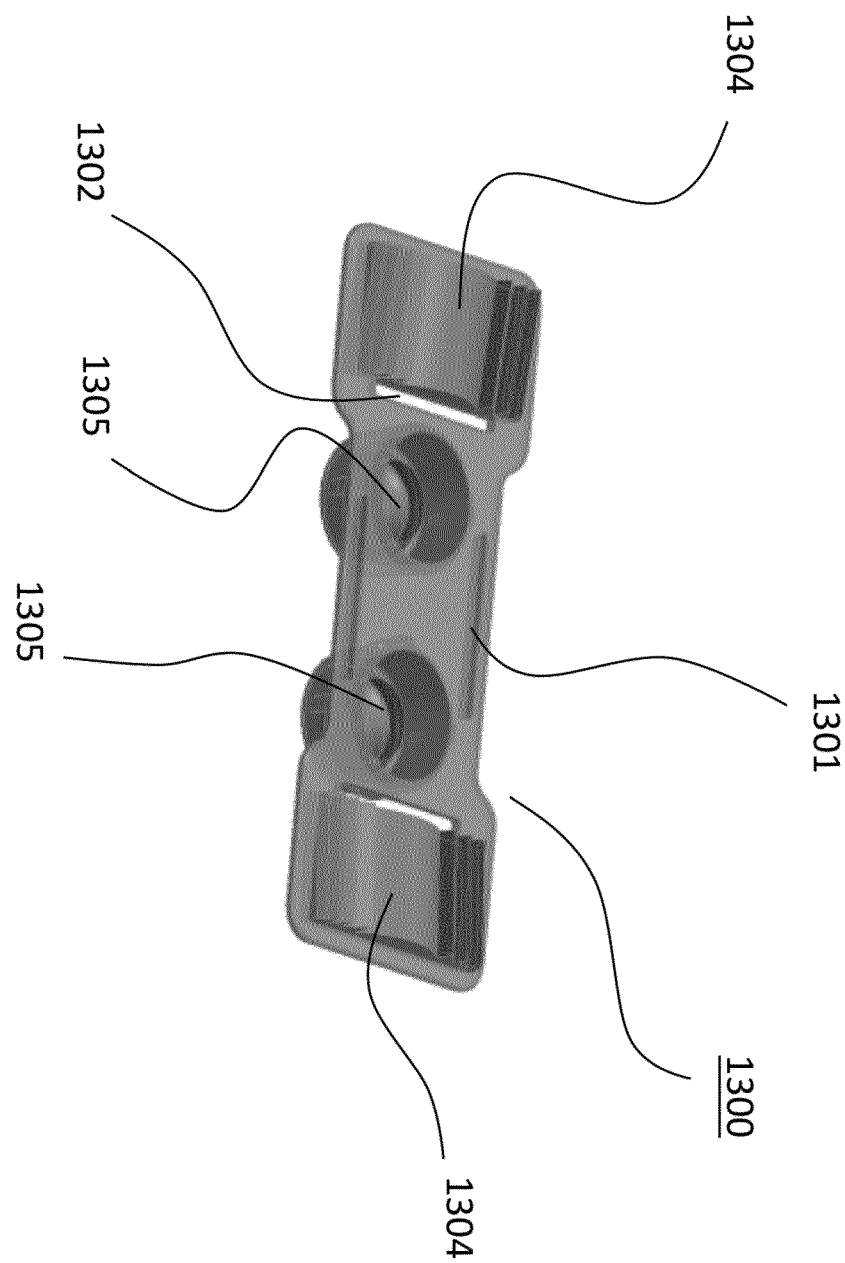
FIG. 13 illustrates the lens plate and its lenses according to an embodiment of the present invention.

According to an embodiment of the present invention, the lens plate is a single PMMA (e.g. Plexiglas) piece, made by means of injection molding, that includes four separate lenses: two for the LEDs 1207 and two for the phototransistors 1206. The PMMA material is for instance chosen because of the compromise or trade off between manufacturability and functionality. FIG. 13 shows the lens plate 1300, with the indicated lenses 1304, 1305. The central, cylindrical lenses 1305 are for the LEDs 1207 while the outside ones 1304 are for the phototransistors 1206. Snap recesses 1301 are foreseen in the lens plate 1300 to be positioned beneath the snaps of the housing, whereas openings 1302 between outer lenses 1304 and the rest of the plate 1300 are made to avoid internal reflection of LED light to the phototransistor lenses 1304.

Figure 14:
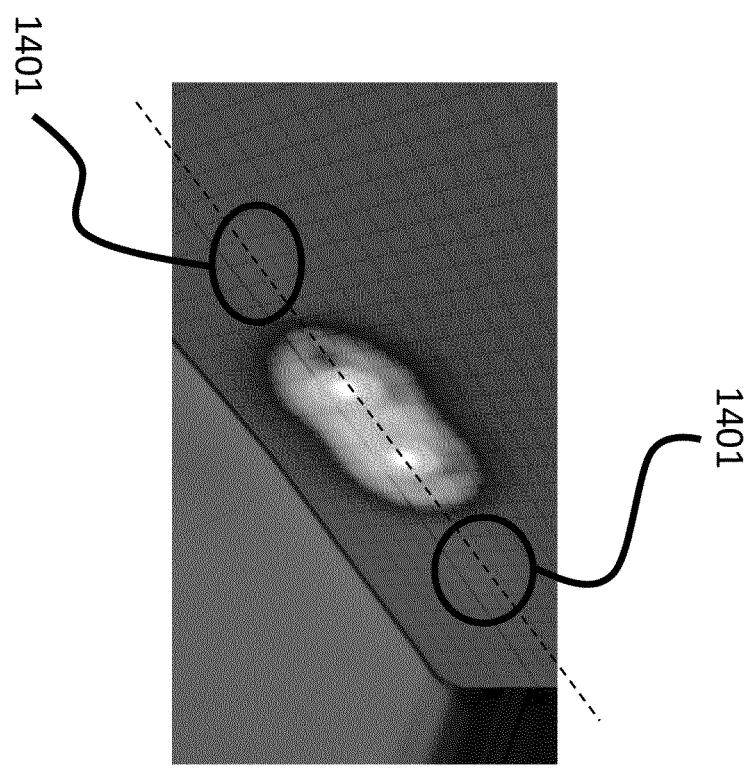
FIG. 14 illustrates the optical alignment of emitter and receiver according an embodiment of the present invention.

Each lens 1304, 1305 is specifically designed for a sensor system 1200 (see also 100, 200 in FIGS. 1 and 2) according to the present invention. The LED lenses 1305 are cylindrical lenses that lead to a focused light beam creating a circular spot of 8-10 mm diameter. These lenses 1305 are designed as Fresnel lenses to avoid having a plastic part too thick to mold without issue. The small opening angle of the emitted light beam from the LEDs 1207 allows the sensor system 1200 to be used at a distance d or d' with large variable range to the meter, whereas the size of the spot does not change significantly with the distance. The phototransistor lenses 1304, also designed as Fresnel lenses, focus the field of view of each phototransistor 1206 to a horizontal line of a certain thickness or ellipse-alike view, as shown in FIG. 14. For this picture, the phototransistors 1206 are replaced by red colored LEDs to provide a visualization of the optical alignment between emitter and receiver, as illustrated by the dashed line. The indicated spots 1401 are red colored. The lenses 1304 for the phototransistors 1206 are oriented or pivoted slightly towards the center of the disc, maximizing the amount of LED light reflected to the phototransistors. In FIG. 1 this is schematically illustrated—yet in an exaggerated way—by the outer lines drawn within the box representing the lenses 140 of the sensor system 100.

The LED light spots are not focused on the disc 1201 itself but at infinity and the emitted beams 1209 are parallel to each other and perpendicular to the meter 1202. This creates two spots of constant size, independent of the distance between the sensor system 1200 and the disc 1201, further enabling the sensor system 1200 to be used at over a large distance range from 0.5 to 10 cm from the meter 1202.

PCB and Components

The PCB and its components rely on state-of-the-art existing and standard available material, i.e. not adapted or customized, although particular components, such as the LEDs and the phototransistors for example are particularly chosen according to an embodiment of the invention.

Algorithms and Processing

Due to the large number of operations to be described in this section, each step will be described in the logical order for the signal processing. In accordance with an embodiment of the invention, the steps of 'Signal generation' up to 'Mark detection' as mentioned below, are performed in both signal channels independently, whereas each signal is captured by one of the phototransistors in a predetermined way, i.e. Left signal is captured by Left side phototransistor, and Right signal is captured by Right side phototransistor. The step of 'Rotation detection' requires the results of both signals (Left and Right) processed together to perform correctly.

Signal Generation

According to an embodiment of the invention, the LEDs are for example selected as emitting light within the visible spectrum, except using e.g. the color red while the mark on a watt-hour meter disc is often colored red (instead of common black). In particular, infrared LED light is not preferred, whereas existing coatings in the field often reflect infrared light, and therefor may cause disturbing noise on the signals captured by the sensor system. As a result, the signal is for instance generated by two blue LEDs projecting light onto the meter disc. Each LED is modulated at a frequency of 1 kHz, for example for a 25% on and 75% off status. The blue light was chosen to ensure that it is absorbed by all black and red marks or stripes on the meter disc. The modulation frequency was selected to make a clear distinction between the intended LED light and the unwanted ambient light coming from many possible types of light sources present in households, such as for instance incandescent light bulbs, LED lamps, halogen lamps, neon tubes, fluocompact lamps and HID lamps. This method is also used to make a clear distinction between the intended LED light and the unwanted light originating from exposure to sunlight. Moreover, light sources of 300 à 400 Hz may cause flicker due to on/off pulsation, whereas modulated or pulsed light is generally preferred for avoiding noise and disturbances. A frequency significantly above the 300-400 Hz range is chosen in order to avoid flicker, and therefor the LED is modulated at 1 kHz frequency.

Figure 16:
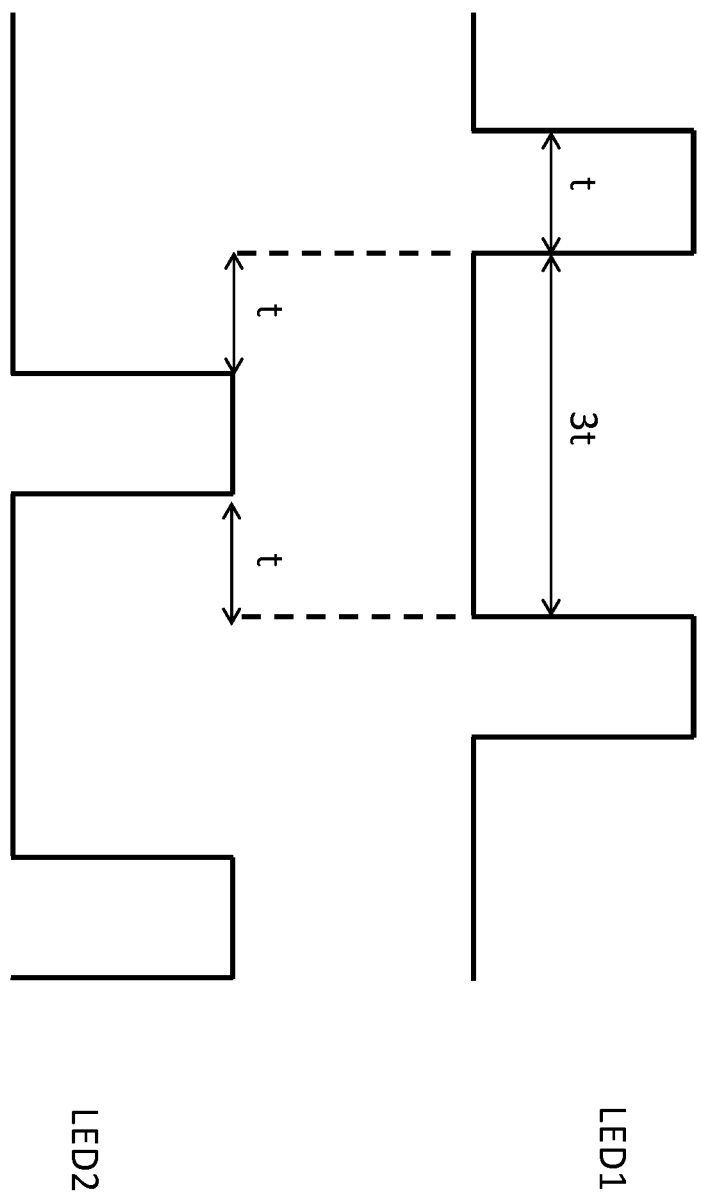
FIG. 16 illustrates the modulated LED light sources according to an embodiment of the invention.

Further referring to the presence of two LEDs, it is mentioned that their on/off status schedules differ amongst each other. As shown in FIG. 16, the pulse interval of both LEDs doesn't coincide, but the pulse of LED2 appears one time interval later than the pulse of the LED1 sequence. According to an embodiment of the invention, a particular symmetry and synchronization between both LED light pulses is applied for an improved working of the sensor system. Both LED1 and LED2 signals are identical in shape but are shifted over 2t in time (4t being the period of the signal). Crosstalk is herewith avoided.

Signal Acquisition

The signals used for the rest of the processing are the ones obtained by phototransistors, and a 24-bit ADC at a sampling frequency of 24 kHz. While respecting the Nyquist formula, this implies that for every signal channel 24.000 measuring points per second are generated, whereas each sample point corresponding with particular amplitude is translated and stored into a 24-bit representation within the central processing unit or CPU. Due to the 24-bit representation, a total of $2^{24}$ possible values or levels can be identified for the analysis of amplitude spectra of the captured signals, and hence considering the environmental light many different light signals on different levels of e.g. brightness, and/or intensity can be added, even though they are not important, and will eventually not effect the final result. The resolution of the ADC was chosen to ensure a sufficient resolution in all situations from dark environments to direct sunlight.

Although the signal is AC coupled, a 10-bit ADC is used to sample the operating point of the phototransistor, after making use e.g. its sensitivity curve in order to transfer all captured signal parts to a sort of leveling out while bringing them on a curve with comparable signal strength. This allows for gain compensation of the phototransistor with respect to ambient light intensity, effectively suppressing signal level variations of the measured LED light intensity, hence providing a more robust and reliable system. A correction for normalization of the signal is thus performed. The 10-bit is chosen arbitrary, meaning that other logical variants are also possible to consider.

Signal Conditioning

Figure 17:
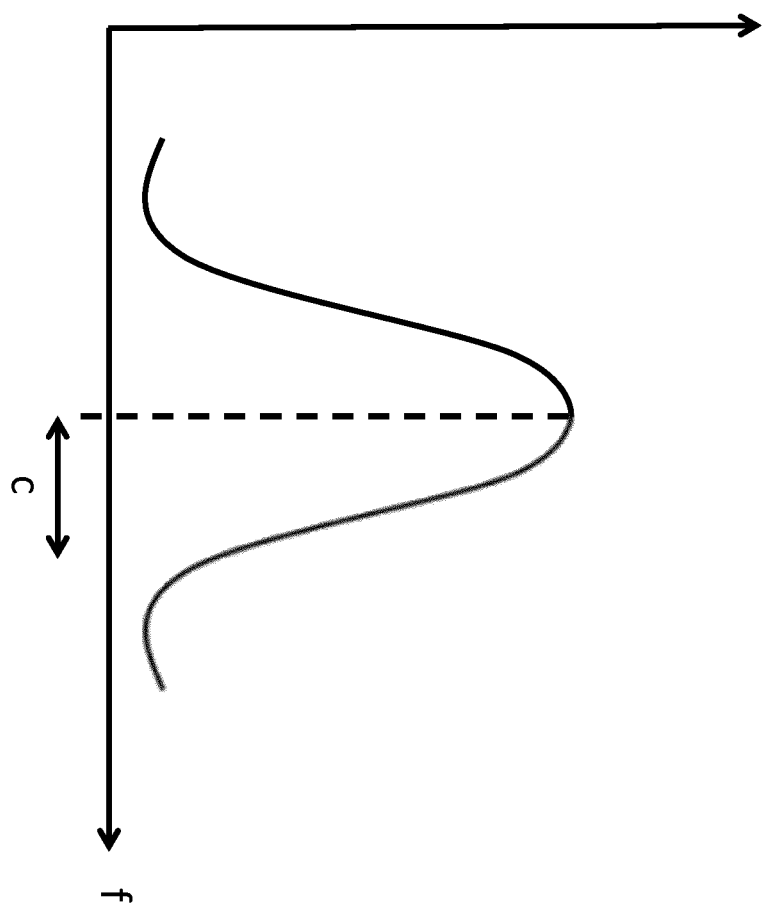
FIG. 17 is a schematic representation of a Chebyshev bandpass filter used according to an embodiment of the invention.

The signal obtained from the 24-bit ADC is processed through the following steps:
1. The signal is fed through a digital Chebyshev bandpass filter, centered at the 1 kHz modulation frequency as illustrated in FIG. 17 wherein c is e.g. 5 Hz. By doing so, the intended LED light is retrieved and distinguished from the ambient light sources.
2. The filtered signal is compensated for changes in sensitivity of the phototransistor due to ambient light fluctuations, using the also-sampled operating point. A calibration curve was measured and is saved on the controller.
3. After compensation, the signal is rectified and the envelope gets detected. In this process, the signal sampling frequency is also lowered, to for instance 200 Hz, in order to reduce the processor load, while still having enough critical data or signal information for performing an accurate measurement analysis.

Mark Detection

Figure 15:
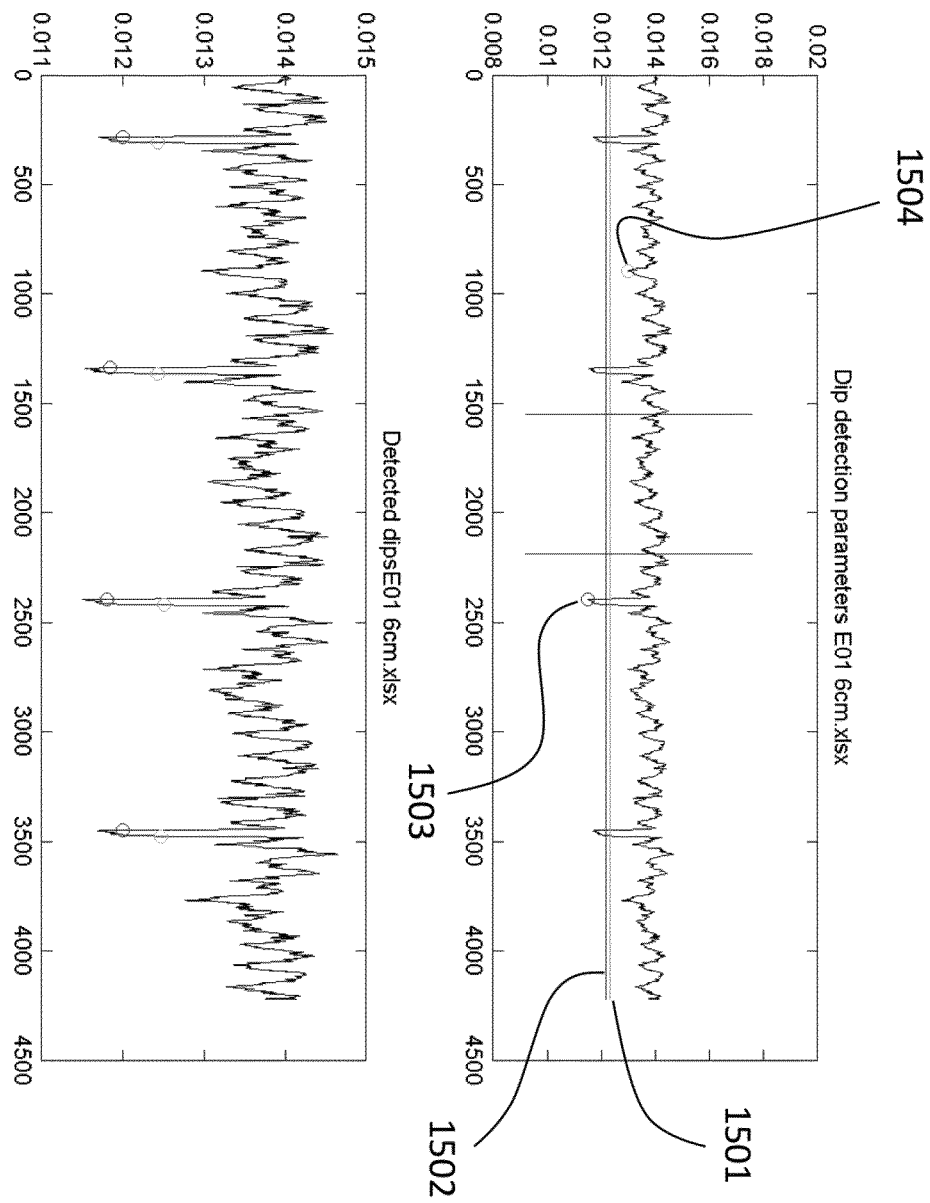
FIG. 15 illustrates the dip detection and determination of thresholds in accordance with an embodiment of the present invention.

Once the envelope of the signal has been computed, the occurrence of the mark on the disc in front of the sensor system can be detected as a dip in the signal intensity, created by the higher absorption of light by the black or red mark compared to the rest of the disc. The mark detection is performed using two thresholds 1501, 1502 as illustrated in FIG. 15, the signal having to pass under the lower one and come back above the higher one for a mark to be detected. The thresholds are defined during the calibration procedure as described below. According to an embodiment, absolute minimum 1503 and local dip 1504 are determined for defining the thresholds 1501, 1502 to be used for mark detection and signal calibration. As an example, the first threshold 1501 is e.g. chosen at 45% below the local dip 1504, whereas the second threshold 1502 is e.g. defined as 45% above the absolute minimum 1503. Hence the range between both threshold values 1501, 1502 represents the left over 10%. The thresholds are constantly updated to keep up with any change in signal amplitude due to temperature changes and component degradation.

Rotation Detection

To define whether a pulse must be sent out to the meter module, signaling a full rotation of the disc, the algorithm makes full use of the marks detected by the two sensors. A pulse is only accounted for once a mark has been detected by both sensors: a positive pulse (energy consumption is larger than possible energy production) if a mark is detected on the left phototransistor subsequently followed by the right phototransistor and a negative pulse (energy production is larger than energy consumption) in the inverse case.

The algorithm is also robust against a missed mark in either signal, correcting itself automatically by adding two pulses if required.

Changes of direction caused by the transition from consumption to production or reciprocally are also correctly detected thanks to the algorithm taking both signals into account before making a decision on the pulse to be sent out.

Installation and Use

Installation by Technician

The first step during installation of the sensor system is the correct positioning of the sensor system in front of the meter disc. This can be done using the two LED spots. These spots must be focused on the disc and placed symmetrically left and right of the center of the disc. Once the position has been determined using the LED light spots, the four brackets can be pressed against the cabinet, and hence fixed as described above.

Calibration

The sensor system calibration is related to the definition of the thresholds as described above. This calibration is performed automatically after powering on of the sensor system. Hence, this means both after an installation by the installer and as recovery method after a power down of the sensor system. Note that the following detail about the procedure is independently executed for each signal channel.

The calibration method comprises two parts: a bootstrap algorithm providing a first rough version of the thresholds, and a refinement phase, refining and/or updating these thresholds to get the highest possible immunity to noise and signal drift. According to an embodiment, the refinement phase never ends, i.e. it continues adapting the thresholds during the life of the sensor system.

1. Bootstrap Phase

On sensor system start-up, no valid thresholds are known. To come to a first version of these thresholds, the algorithm keeps track of the minimum and the average of the signal. The thresholds are continuously redefined between these two evolving measurements. At the same time, these thresholds are used to detect dips in the signal. When a dip is detected, its minimum is recorded. When the last five recorded minima are close enough together and rather far away from all the other measured points, the bootstrap phase is considered to be successful and the controller continues with the refinement phase. Numerous extra checks are in place to prevent premature bootstrapping on a disc that is not moving.

2. Refinement Phase

In the refinement phase, the minimum of every dip and the minimum between two dips are measured and subsequently used to each update and exponential moving average. These slowly-adapting versions are used to update the thresholds. This way, the thresholds evolve along with any drift due to aging or thermal influences.

The sensor provides feedback to the external metering module and hence to the installer after a successful calibration.

Removal and Repositioning

The sensor can easily be removed from the meter, leaving only the four brackets in place. This allows for an easier reading of the meter index. The sensor system is robust against such use and will continue working normally and as before, once put back in clicked mounted position.

List of Challenges Overcome with the Present Invention

Large distance range (0.5-10 cm)

Optical design with parallel beams and light sensors or phototransistors with a large field of view due to lenses focusing the light beams to circular spots of about 8 to 10 mm diameter and focusing the light sensors' fields of view to a horizontal line, avoiding noise and reflections from around the disc Positioning centered with respect to disc, no other requirement or tuning necessary. The design of the optical system including lenses, LEDs and phototransistors is such that it allows for a mm-range misalignment (e.g. up to 2-4 mm) in both directions perpendicular to the plane of the meter disc (above and below). This contributes directly to ease of installation of the sensor system.

Variables Meter Properties

Works with all meter discs (red or black mark, polished or corrugated disc)

Works through all meter cabinets

Works when directly placed on meter if sufficiently large area to place the sensor system Automatic and autonomous calibration, no input required Variable Environmental Conditions Robustness to any sort of ambient light due to modulated LED light and bandpass filtering of the signals Robustness to temperature changes (day versus night, season, light . . . ) due to continuous monitoring of thresholds compared to signal levels Installation must be possible very quickly, e.g. in 5 min Easy fixation mechanism, only requirement is having both light spots symmetrically on the meter disc Automatic and autonomous calibration, no input required One size fits all, no tuning required based on meter, environment etc. . . .

It Must be Possible to Read the Meter Index

Fixation mechanism makes it easy to remove the sensor system to consult the meter index. The sensor system will continue working once clicked back in position on the brackets Meters Where Both Consumption and Production is Possible Concept with two detection spots; makes it possible to determine the direction of the disc rotation

The invention claimed is:

1. A system for detecting a change on a moving surface, the system comprising:
   a first light generating device for generating light to be directed to the moving surface;
   a first light sensor for capturing reflected light from the moving surface;
   a further light generating device for generating light to be directed to the moving surface; and
   a further light sensor for capturing reflected light from the moving surface,
   wherein:
   the change on the moving surface is detected based on the reflected light captured by the first light sensor;
   the first light generating device and the first light sensor are arranged relatively towards each other in that the change is reliably detected for a variable distance within a predetermined range of the system from the moving surface;
   the change on the moving surface is further detected based on the reflected light captured by the further light sensor; and
   the change on the moving surface as detected twice in a respective manner is compared for generating further information about the movement of the moving surface.

2. The system of claim 1, further comprising a housing in which the light generating devices, the light sensors, and a processing system are mounted, and wherein at least part of the housing comprises an anti-reflection surface and/or a physical barrier.

3. The system of claim 2, further comprising:
at least one bracket for removable attachment of the housing to a mounting surface from where the change on the moving surface is viewable,
wherein:
the at least one bracket is provided with an adhesive; and
the at least one bracket comprises mechanical obstructions that match with a mechanical obstruction on the housing.

4. The system of claim 1, further comprising:
a first optical means for focusing light emitted from the first light generating device; and
a second optical means for focusing light reflected from the moving surface,
wherein:
the first optical means is oriented differently from the second optical means; and
further to the first light generating device and the first light sensor their corresponding first and second optical means are arranged relatively toward each other in that the change is reliably detected for a variable distance within a predetermined range of the system from the moving surface.

5. The system of claim 4, wherein the first optical means and/or the second optical means are lenses.

6. The system of claim 4, wherein the optical axis of the first optical means is not parallel with the optical axis of the second optical means.

7. The system of claim 4, wherein the first optical means is mounted in the system with its optical axis substantially perpendicular to the moving surface, and at a position such that its distance to the moving surface is comparable or almost equal to the distance between the second optical means and the moving surface.

8. The system of claim 4, wherein at least part of the housing comprises a physical barrier between the first optical means and the second optical means.

9. The system of claim 4, wherein:
a particular relation is defined between the positions of the first optical means and the second optical means respectively; and
an off-set distance is defined between the optical axis of the first optical means and the central axis of the moving surface being perpendicular to the first optical means' plane.

10. The system of claim 9, wherein the particular relation is further related to the field of view of the light sensor.

11. The system of claim 1, wherein the light generating device is a light-emitting diode or an LED, and/or wherein the light sensor is a phototransistor.

12. A method for detecting a change on a moving surface, the method comprising:
transforming reflected light from a moving surface and obtained using the system of claim 1 into an interpretable signal; and
processing and conditioning the signal to detect the change on the moving surface.

13. A data processing system comprising:
means for carrying out the method of claim 12;
optionally, a computer program comprising software code adapted to perform the method of claim 12; and
optionally, a computer readable storage medium comprising the computer program.

14. A method for detecting a change on a moving surface, the method comprising:
transforming reflected light from a moving surface and obtained using the system of claim 1 into an interpretable signal;
processing the signal such that at least two thresholds are automatically generated for detecting the change on the moving surface.

15. A data processing system comprising:
means for carrying out the method of claim 14;
optionally, a computer program comprising software code adapted to perform the method of claim 14; and
optionally, a computer readable storage medium comprising the computer program.

* * * * *